(12) United States Patent
Tsuruma

(10) Patent No.: US 6,355,496 B2
(45) Date of Patent: *Mar. 12, 2002

(54) ELECTRODE FOR OPTICAL WAVEGUIDE ELEMENT

(75) Inventor: Isao Tsuruma, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/527,468

(22) Filed: Mar. 17, 2000

Related U.S. Application Data

(62) Division of application No. 08/958,581, filed on Oct. 28, 1997, now Pat. No. 6,060,334.

(30) Foreign Application Priority Data

Oct. 28, 1996 (JP) .............................................. 8-284800

(51) Int. Cl.⁷ ................................................ H01L 21/00

(52) U.S. Cl. ........................................... 438/31; 438/31

(58) Field of Search ................................ 385/129, 130, 385/131, 132; 359/332; 438/31, 32

(56) References Cited

U.S. PATENT DOCUMENTS

| | | | |
|---|---|---|---|
| 3,616,282 A | 10/1971 | Bodway | 204/15 |
| 5,032,220 A | 7/1991 | Yamamoto et al. | 156/643 |
| 5,121,237 A | 6/1992 | Ikeda et al. | 359/67 |
| 5,617,493 A | 4/1997 | Nishimoto | 385/40 |
| 5,834,055 A | 11/1998 | Mahapatra et al. | 427/163.2 |
| 5,895,742 A * | 4/1999 | Lin | 430/321 |
| 5,959,765 A * | 9/1999 | Nakamura et al. | 359/326 |

FOREIGN PATENT DOCUMENTS

| | | |
|---|---|---|
| FR | 002606554 A1 | 5/1988 |
| JP | 406194523 A | 7/1994 |
| JP | 7146457 | 6/1995 |

* cited by examiner

*Primary Examiner*—Charles Bowers
*Assistant Examiner*—William M. Brewster
(74) *Attorney, Agent, or Firm*—Sughrue Mion, PLLC

(57) ABSTRACT

When forming electrodes for an optical waveguide element, a metal film is formed on a surface of a substrate, and openings of predetermined shapes are formed in the metal film. Then proton exchange is carried out on the surface of the substrate with the metal film used as a mask, and optical channel waveguides are thus formed. At least a part of edge portions of the metal film defining the openings is left on the substrate and the metal film is plated with plating metal. The metal film plated with the plating metal is processed into electrodes of predetermined shapes for applying an electric voltage to the optical channel waveguides.

4 Claims, 10 Drawing Sheets

F I G. 6A 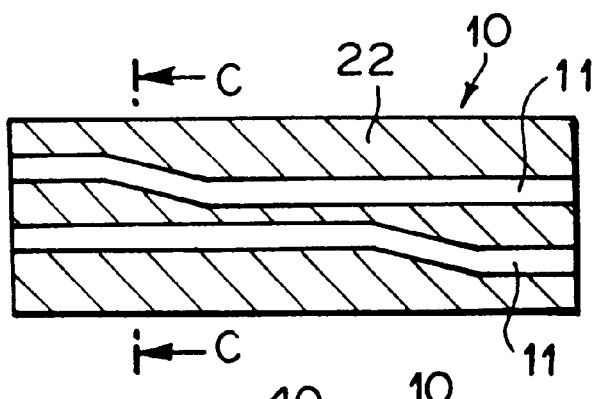
F I G. 6B 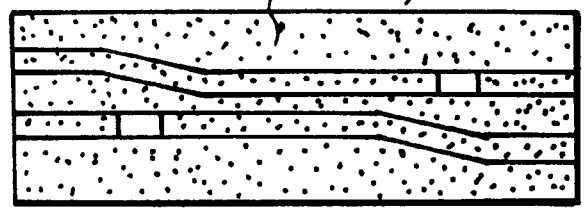
F I G. 6C 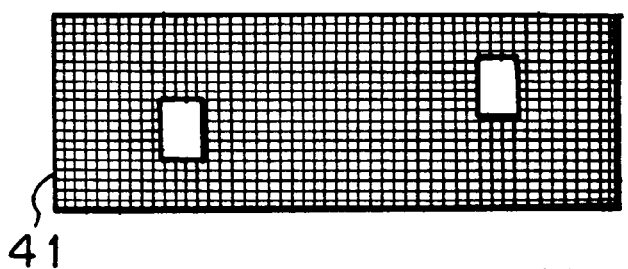
F I G. 6D 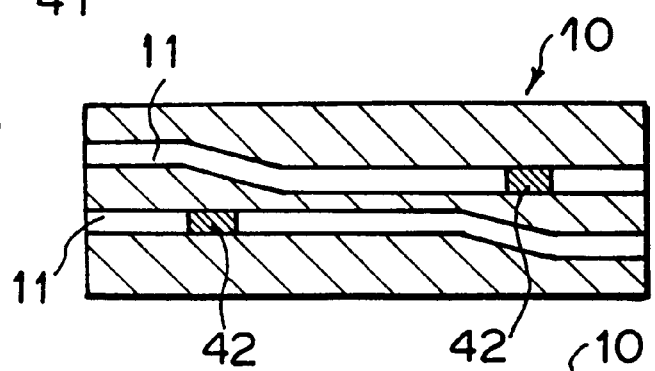
F I G. 6E 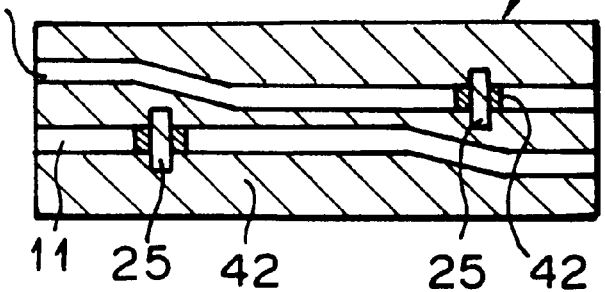

F I G. 7A 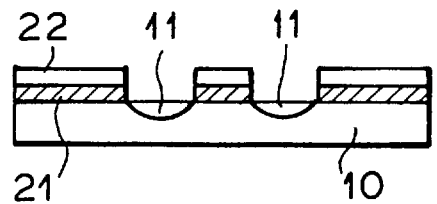
F I G. 7B 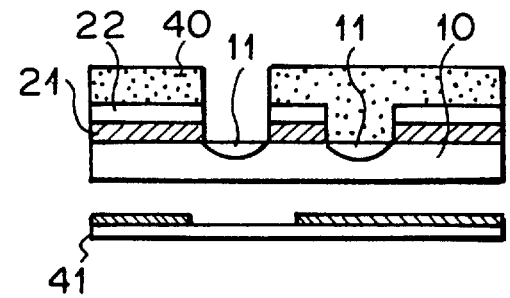
F I G. 7C 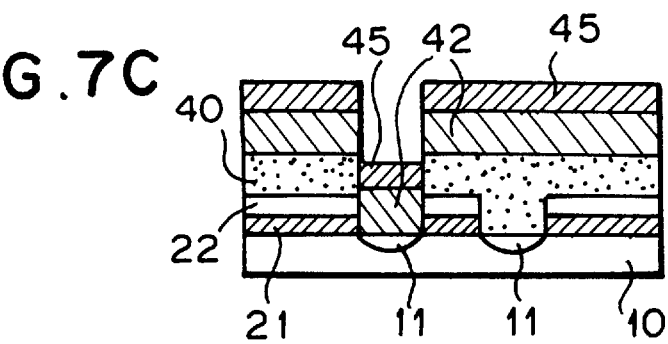
F I G. 7D 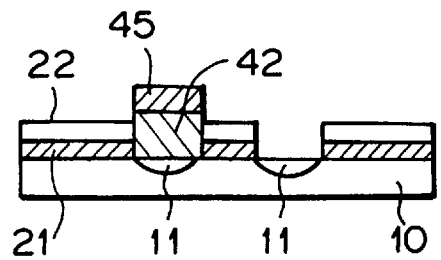
F I G. 7E 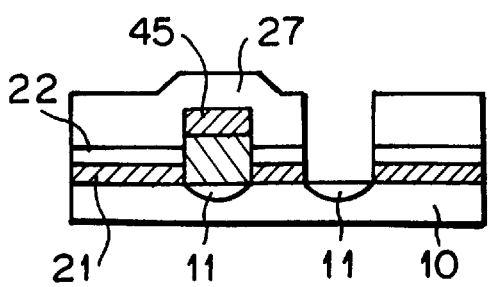

PRIOR ART

ELECTRODE FOR OPTICAL WAVEGUIDE ELEMENT

This application is a division of Ser. No. 08/958,581, filed Oct. 28, 1997 U.S. Pat. No. 6,060,334.

BACKGROUND OF THE INVENTION

1. Field of the Invention

This invention relates to an electrode for applying an electric voltage to an optical channel waveguide of an optical waveguide element in which the optical channel waveguide is formed by proton exchange, and a method of forming the electrode.

2. Description of the Related Art

There have been provided various optical waveguide elements having an optical channel waveguide formed on a substrate. As a method of forming the optical channel waveguide, there has been known a proton exchange process.

In the proton exchange process, metal film is first formed on a surface of a substrate, an opening is formed in the metal film by etching and proton exchange is carried out on the surface of the substrate using the metal film as a mask.

Generally an electric voltage is applied to the optical channel waveguide through electrodes disposed near or just above the optical channel waveguide.

A conventional method of forming the electrodes for applying an electric voltage to the optical channel waveguide will be described with reference to FIGS. 9A to 9H, hereinbelow.

Metal film 2 such as of Cr is first formed on a substrate 1 as shown in FIG. 9A.

A resist layer 3 is formed on the metal film 2 in a predetermined pattern by photolithography as shown in FIG. 9B.

Then the metal film 2 is etched to form openings 4 in a predetermined pattern in the metal film 2 using the resist layer 3 as a mask, and the resist layer 3 is removed as shown in FIG. 9C.

Thereafter proton exchange is carried out using the metal film 2 with the openings 4 as a mask, thereby forming optical channel waveguides 5 on the surface of the substrate 1 as show in FIG. 9D.

The metal film 2 is then removed by etching as shown in FIG. 9E and the substrate 1 is annealed as required.

Thereafter a conductive film 7 such as of aluminum is formed over the surface of the substrate 1 as shown in FIG. 9F.

A resist layer 8 is formed over the conductive film 7 with portions opposed to the optical channel waveguides 5 exposed by photolithography as shown in FIG. 9G.

Then the conductive film 7 is removed at the portions opposed to the optical channel waveguides 5 by etching using the resist 8 as a mask as shown in FIG. 9H.

When the resist 8 is thereafter removed, the conductive films 7 are left on opposite sides of each optical channel waveguide 5. The conductive films 7 on opposite sides of each optical channel waveguide 5 can be used as electrodes for applying an electric voltage to the optical channel waveguide 5.

However this method is disadvantageous in the following point. That is, when the resist mask 8 is formed over the conductive film 7 with the portions opposed to the optical channel waveguides 5 exposed, the edge of the resist mask 8 circumscribing the optical channel waveguide 5 cannot be precisely aligned with the edge of the optical channel waveguide 5 due to fluctuation in skill of the operator and/or in precision of the exposure device. Accordingly, the edges of the electrodes (conductive film) hang over the optical channel waveguide or are positioned away from the edge of the optical channel waveguide 5 as shown in FIG. 10 in an enlarged scale, which results in fluctuation in performance of the optical waveguide element or deterioration in yield. In FIG. 10, L denotes the alignment error.

In Japanese Unexamined Patent Publication No. 7(1995)-146457, there is disclosed a method of forming the electrodes for a optical waveguide element which can overcome such a problem. In the method, the metal film which is used as a mask for setting the pattern of the optical waveguide upon proton exchange is left there and used as the electrodes. That is, metal film is formed on a surface of a substrate, openings of predetermined shapes are formed in the metal film, proton exchange is carried out on the surface of the substrate with the metal film used as a mask, thereby forming optical channel waveguides, and the metal film is removed with at least a part of the edges of the openings left there. The metal film fractions are used as the electrodes.

In the method the openings of predetermined shapes are formed in the metal film generally by etching though liftoff may be used.

When metal film is processed by etching or liftoff, the thickness of the metal film should be several hundred nanometers (nm) at most. When such thin metal film is used as an electrode, the resistance of the electrodes becomes high and accordingly optical waveguide elements provided with such electrodes are hard to operate at high speed (e.g., high speed modulation at several hundred MHz or higher).

SUMMARY OF THE INVENTION

In view of the foregoing observations and description, the primary object of the present invention is to provide an electrode for an optical waveguide element which is formed with its one edge precisely aligned with one edge of the optical channel waveguide and at the same time makes it feasible to operate the optical waveguide element at high speed.

Another object of the present invention is to provide a method of forming such electrodes for an optical waveguide element.

In the method of the present invention, a part of the metal film which is used as a mask for setting the pattern of the optical waveguide upon proton exchange is left there as in the above identified Japanese patent publication (Japanese Unexamined Patent Publication No. 7(1995)-146457), then the metal film is plated and used as the electrodes.

That is, in accordance with a first aspect of the present invention, there is provided a method of forming electrodes for an optical waveguide element comprising the steps of forming a metal film on a surface of a substrate, forming openings of predetermined shapes in the metal film, carrying out proton exchange on the surface of the substrate with the metal film used as a mask, thereby forming optical channel waveguides, leaving at least a part of edge portions of the metal film defining the openings, plating the metal film with plating metal, and processing the metal film plated with the plating metal into electrodes of predetermined shapes for applying an electric voltage to the optical channel waveguides.

In the method of forming electrodes for an optical waveguide element in accordance with a second aspect of the present invention, the metal film used as a mask in the proton exchange is first processed into metal film fractions of predetermined shapes corresponding to the shapes of electrodes to be formed, each metal film fraction including at least a part of an edge portion defining one of the openings, and then the metal film fractions are plated with plating metal and used as the electrodes for applying an electric voltage to the optical channel waveguides.

In the method of forming electrodes for an optical waveguide element in accordance with a third aspect of the present invention, in the method of the first or second aspect of the present invention, negative photo-resist is applied to the substrate after said proton exchange and before said plating, then the photo-resist is exposed to light from the back side of the substrate using the metal film as a photo-mask, the photo-resist is subsequently removed with the part of the photo-resist which is on the optical channel waveguides and accordingly exposed to light left there, and then the plating is effected using as a mask the part of the photo-resist left on the substrate.

In accordance with a fourth aspect of the present invention, there is provided an electrode for an optical waveguide element which is formed on a substrate, on which an optical channel waveguide is formed by proton exchange, with its one edge aligned with one edge of the optical channel waveguide and is for applying an electric voltage to the optical channel waveguide, wherein the improvement comprises that the electrode comprises a metal film fraction which is a part of metal film used as a mask when the optical channel waveguide is formed by the proton exchange and a plating metal layer formed on the metal film fraction by plating.

Preferably a buffer layer is formed between the substrate and the metal film.

The metal film used as a mask for setting the pattern of the optical channel waveguide upon proton exchange naturally has an edge aligned with an edge of the optical channel waveguide. Accordingly when an electrode is formed by plating the metal film including at least a part of an edge portion defining one of the openings, the edge of the electrode can be precisely aligned with the edge of the optical channel waveguide.

When the metal film plated with metal is used as an electrode, the thickness of the electrode increases and the resistance of the electrode lowers as compared with when the metal film is used as an electrode as it is. Accordingly the optical waveguide element in which an electric voltage is applied to the optical channel waveguide through the electrode can be operated at high speed.

When the plating metal layer comes to hang out over the optical channel waveguide from the edge of the metal film, the finished electrode cannot have an edge aligned with the edge of the optical channel waveguide even if the metal film on which the plating metal is plated has an edge aligned with the edge of the optical channel waveguide, which results in the same problem as that described above in conjunction with FIG. 10.

The method in accordance with the third aspect of the present invention can overcome this problem. That is, when the negative photo-resist applied to the substrate after the proton exchange is exposed to light from the back side of the substrate using the metal film as a mask, the exposed part of the photo-resist has an edge precisely aligned with the edge of the optical channel waveguide. Accordingly, by removing the negative photo-resist with the exposed part left there and effecting the plating using the exposed part of the photo-resist as a mask, the plating metal cannot hang out over the optical channel waveguide and the edge of the electrode plated with the plating metal can be precisely aligned with the edge of the optical channel waveguide.

When a buffer layer is formed between the substrate and the metal film, light propagation loss due to the electrode can be reduced.

BRIEF DESCRIPTION OF THE DRAWINGS

FIGS. 6A to 6E are plan views showing the state of the substrate at different steps shown in FIGS. 5A to 5E, FIGS. 7A to 7E are views for illustrating the procedure of forming the electrodes of an optical waveguide element by a method in accordance with a fourth embodiment of the present invention.

DESCRIPTION OF THE PREFERRED EMBODIMENTS

Figure 1A:
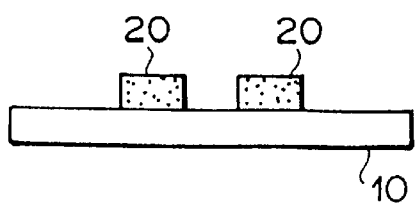
FIGS. 1A to 1H are views for illustrating the procedure of forming the electrodes of an optical waveguide element by a method in accordance with a first embodiment of the present invention.

A finished optical waveguide element will be first described with reference to FIG. 2F for the purpose of simplicity of understanding. As shown in FIG. 2F, the finished optical waveguide element comprises a substrate 10 which may comprise an x-plate of, for instance, a $LiNbO_3$ crystal. A pair of optical channel waveguides 11, which form a directional photocoupler, are formed on a surface of the substrate 10 to extend in Y-direction, and three electrodes 12, 13 and 14 are formed on the surface of the substrate 10 on opposite sides of the portions of the optical channel waveguides 11 where they extend in parallel to each other close to each other and between the portions. The electrodes 12 and 14 are connected to a drive circuit (not shown) and the electrode 13 is connected to the drive circuit by way pad electrodes 16. A predetermined electric voltage is applied to each of the optical channel waveguides 11 through the electrodes 12, 13 and 14.

Each of the edges of the electrodes 12, 13 and 14 adjacent to the optical channel waveguides 11 should be precisely aligned with the corresponding edge of the optical channel waveguides 11. Otherwise it becomes difficult to precisely apply the predetermined voltage to each optical channel waveguide 11.

A method in accordance with a first embodiment of the present invention which makes it feasible to form the electrodes 12, 13 and 14 in the desired manner will be described with reference to FIGS. 1A to 1H, hereinbelow. FIGS. 1A to 1H are cross-sectional views taken along line A—A in FIG. 2A.

Figure 2A:
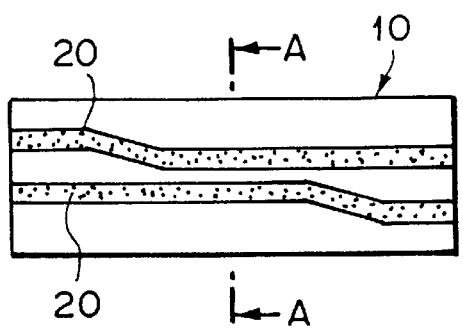
FIGS. 2A to 2F are plan views showing the state of the substrate at different steps shown in FIGS. 1A to 1H, FIGS. 3A to 3H are views for illustrating the procedure of forming the electrodes of an optical waveguide element by a method in accordance with a second embodiment of the present invention.
Figure 2D:
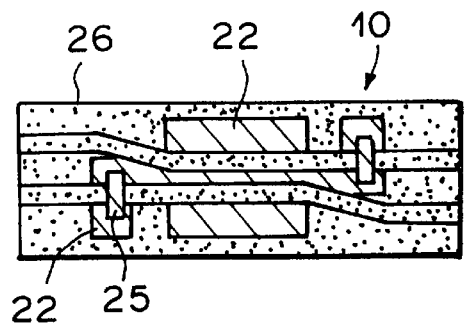

Resist layers 20 are first formed by known lithography on the surface of a substrate 10 in the shape of optical channel waveguides 11 to be formed as shown in FIGS. 1A and 2A.

Figure 1F:
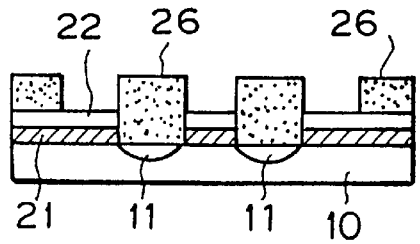
Figure 1B:
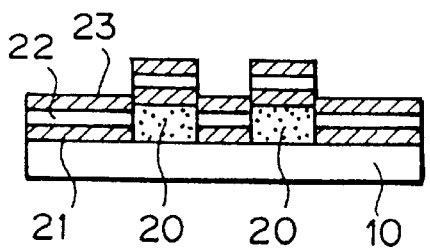

Then a Ta layer 21, an Au layer 22 and a Ta layer 23 are formed by sputtering in this order on the surface of the substrate 10 over the resist layers 20 as shown in FIG. 1B. The layers 21, 22 and 23 are, for instance, 15 nm, 100 nm and 15 nm respectively in thickness.

Figure 1G:
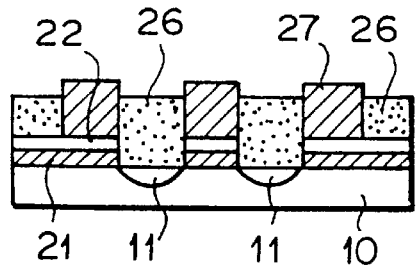
Figure 1C:
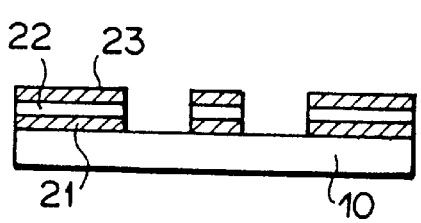
Figure 2B:
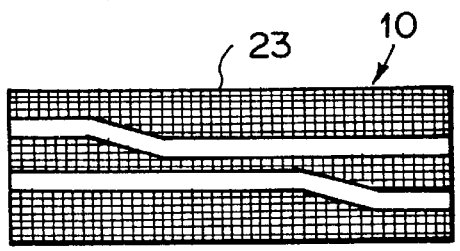

The substrate 10 carrying thereon the resist layers 20 and the metal layers 21, 22 and 23 is then dipped in acetone and subjected to ultrasonic cleaning, and the resist layers 20 and the Ta layer 21, the Au layer 22 and the Ta layer 23 on the resist layers 20 are removed from the substrate 10 by liftoff as shown in FIGS. 1C and 2B.

Figure 1H:
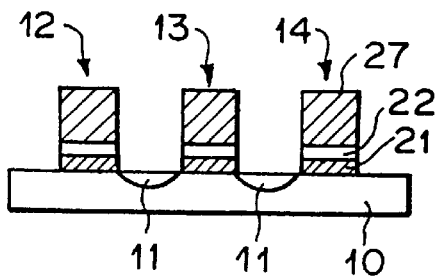
Figure 1D:
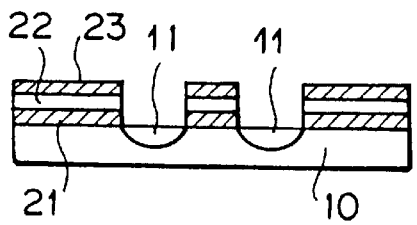

The substrate 10 is dipped in pyrophosphoric acid heated to 150° C. to 200° C. for a predetermined time, whereby the exposed part of the substrate 10 is subjected to proton exchange and optical channel waveguides 11 are formed on the surface of the substrate 10 as shown in FIG. 1D. Since the fractions of the metal film comprising the Ta layer 21, the Au layer 22 and the Ta layer 23 left on the substrate 10 function as a mask upon proton exchange, the optical channel waveguides 11 formed are in the shape of the resist layers 20.

Figure 1E:
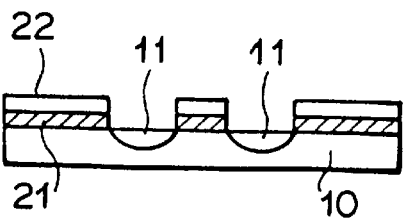

The resulting substrate 10 carrying thereon the optical channel waveguides 11 and the fractions of the metal layer are cleaned and subjected to heat treatment at 340° C. to 400° C. for a predetermined time. Then the upper Ta layer 23 is removed by etching with fluoronitric acid (1:2) as shown in FIG. 1E.

In order to form wirings for connecting the central electrode 13 and the pad electrodes 16 (FIG. 2F), a resist pattern having openings in portions where the wirings are to be formed is formed by lithography. Then Au/Cr is deposited on the substrate 10 by low resistance heating vacuum deposition and the resist pattern is removed by liftoff, leaving wirings 25 of Au/Cr as shown in FIG. 2C.

Thereafter negative photo-resist 26 is applied to the substrate 10, and light is projected onto the surface of the substrate with the photo-resist 26 covered with a photo-mask having openings respectively corresponding to the electrodes 12, 13 and 14 and the pad electrodes 16, thereby exposing the portion of the photo-resist 26 not covered with the photo-mask. Then light is projected onto the backside of the substrate 10 so that the portions of the photo-resist 26 just above the optical channel waveguides 11 are exposed with the Ta layer 21 and the Au layer 22 functioning as a mask. (The portions corresponding to the wiring 25 are not exposed.) When the photo-resist is developed, only the exposed portions of the photo-resist 26 are left on the substrate 10 as shown in FIG. 1F and 2D. The order of the exposure from the front side of the substrate and the exposure from the backside of the substrate may be reversed.

Then Au layer 27 of, for instance, 1 to 4 μm is formed on the substrate 10 by electrolytic plating with the pattern of the photo-resist 26 used as a mask as shown in FIG. 1G.

Figure 2E:
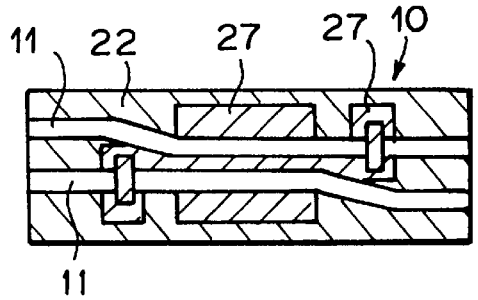
Figure 2C:
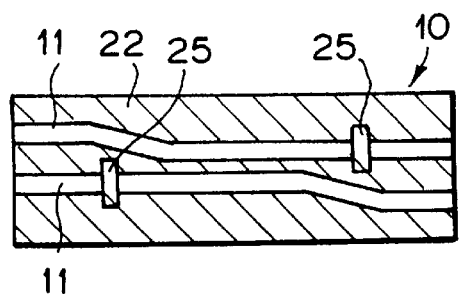
Figure 2F:
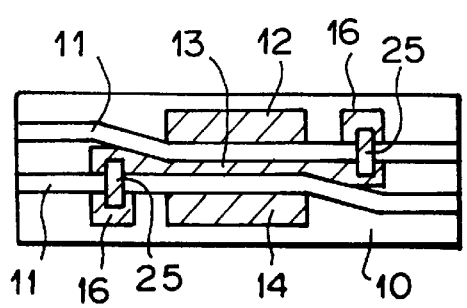

The resist layer 26 is removed by a plasma asher or resist release solution as shown in FIG. 2E, and the Au layer 22 and the Ta layer 21 are removed by etching using the Au layer 27 formed by the plating as a mask as shown in FIG. 1H. Thus the electrodes 12, 13 and 14 and the pad electrodes 16 consisting of the Ta layer 21, the Au layer 22 and the plated Au layer 27 are formed as shown in FIGS. 1H and 2F. Also the wirings 25 are plated with Au 27 and have an increased thickness.

Since the electrodes 12, 13 and 14 are formed by leaving the edges of the Ta layer 21 and the Au layer 22 which define the optical channel waveguides 11 and at the same time the Au layer 27 on the Ta layer 21 and the Au layer 22 is formed using the photo-resist pattern 26, which precisely conforms to the shape of the optical channel waveguides 11, as a mask so that the Au layer 27 cannot hang out over the optical channel waveguides 11, the edges of the electrodes 12, 13 and 14 facing the optical channel waveguides 11 are precisely in alignment with the edges of the optical channel waveguides 11.

Since the electrodes 12, 13 and 14 and the pad electrodes 16 consist of the Ta layer 21 and the Au layer 22 plated with a thick Au layer 27, they are low in electric resistance and can apply an electric voltage at a high frequency not lower than several hundred MHz, whereby high speed drive of the optical waveguide element can be realized.

Further when the resist layers 20 and the Ta layer 21, the Au layer 22 and the Ta layer 23 on the resist layers 20 are removed from the substrate 10 by liftoff in the step shown in FIG. 1C, the Au layer 22 is not exposed. Accordingly, the problem of short circuit due to adhesion of particles of Au to the surface of Au layer and/or deterioration in bonding due to stain of the surface can be avoided.

By forming the openings for defining the shape of the optical channel waveguides 11 by liftoff of the resist layers 20 and the Ta layer 21, the Au layer 22 and the Ta layer 23 on the resist layers 20, the dimensional accuracy of the openings can be higher than by forming the same by etching, which results in a higher dimensional accuracy of the optical channel waveguides 11.

When the Ta layer 23, which is apt to be stained, is removed after the proton exchange, a clean surface of the Au layer 22 is exposed, whereby the contact resistance between the Au layers 22 and the wirings 25 can be reduced and at the same time, a uniform Au layer 27 can be obtained since the Au layer 22 wets well with plating solution.

The width of the wirings 25 which extend across the optical channel waveguides 11 as measured in the direction in which an optical wave is guided is preferably not larger than 50 μm, whereby light propagation loss due to the wirings 25 can be reduced to about 5%.

Further even when fine dust on the surface of the substrate is removed by a mechanical process, for instance, by brush scrape before the proton exchange, the Ta layer 23, which is relatively hard, cannot be damaged and accordingly the pattern of the optical channel waveguides 11 cannot be adversely affected.

Though, in the first embodiment, the Ta layer 21 and the Au layer 22 are processed to a predetermined shape after plated with Au 27, the Ta layer 21 and the Au layer 22 are processed to a predetermined shape before plated with Au 27 in a second embodiment described hereinbelow with reference to FIGS. 3A to 3H and 4A to 4H. FIGS. 4A to 4H are cross-sectional views taken along line B—B in FIG. 3A.

Figure 3A:
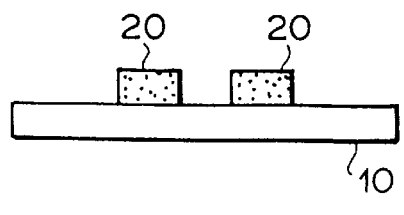
Figure 4A:
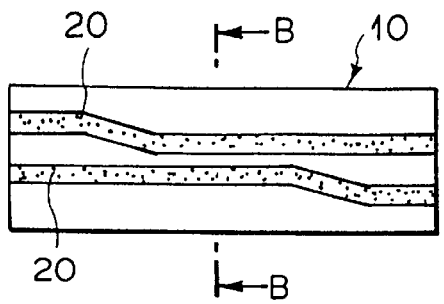
FIGS. 4A to 4H are plan views showing the state of the substrate at different steps shown in FIGS. 3A to 3H, FIGS. 5A to 5E are views for illustrating the procedure of forming the electrodes of an optical waveguide element by a method in accordance with a third embodiment of the present invention.

Resist layers 20 are first formed by known lithography on the surface of a substrate 10 in the shape of optical channel waveguides 11 to be formed as shown in FIGS. 3A and 4A.

Figure 3F:
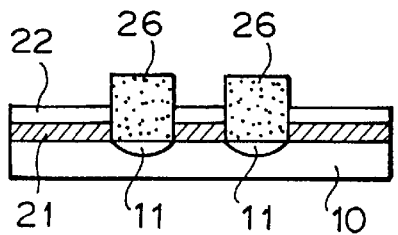
Figure 3B:
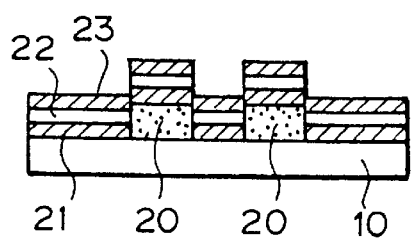

Then a Ta layer 21, an Au layer 22 and a Ta layer 23 are formed by sputtering in this order on the surface of the substrate 10 over the resist layers 20 as shown in FIG. 3B. The layers 21, 22 and 23 are, for instance, 15 nm, 100 nm and 15 nm respectively in thickness.

Figure 3G:
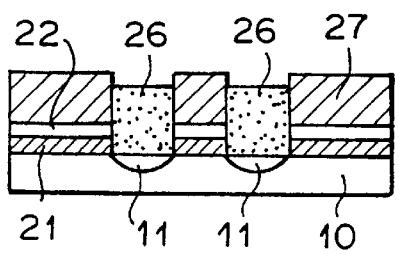
Figure 3C:
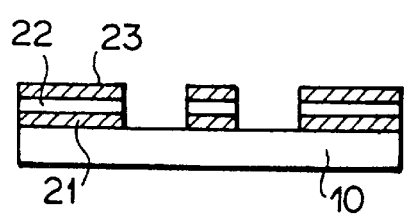
Figure 4E:
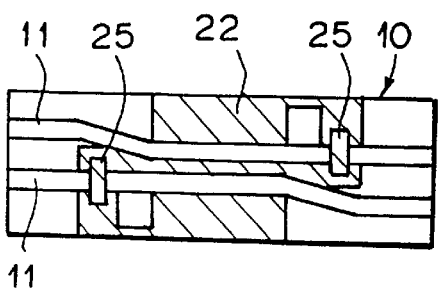
Figure 4B:
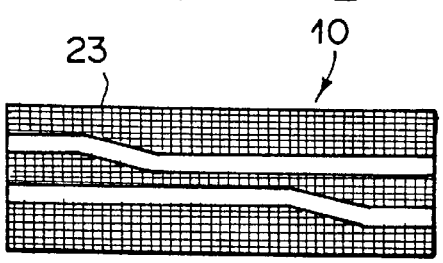

The substrate 10 carrying thereon the resist layers 20 and the metal layers 21, 22 and 23 is then dipped in acetone and subjected to ultrasonic cleaning, and the resist layers 20 and the Ta layer 21, the Au layer 22 and the Ta layer 23 on the resist layers 20 are removed from the substrate 10 by liftoff as shown in FIGS. 3C and 4B.

Figure 3H:
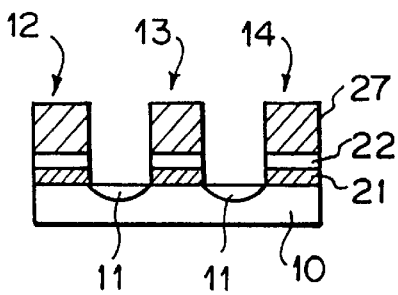
Figure 3D:
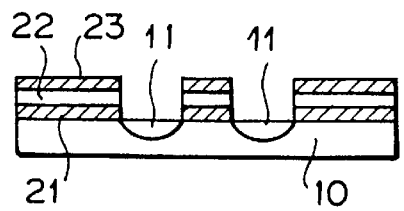

The substrate 10 is dipped in pyrophosphoric acid heated to 150° C. to 200° C. for a predetermined time, whereby the exposed part of the substrate 10 is subjected to proton exchange and optical channel waveguides 11 are formed on the surface of the substrate 10 as shown in FIG. 3D. Since the fractions of the metal film comprising the Ta layer 21, the Au layer 22 and the Ta layer 23 left on the substrate 10 function as a mask upon proton exchange, the optical channel waveguides 11 formed are in the shape of the resist layers 20.

Figure 3E:
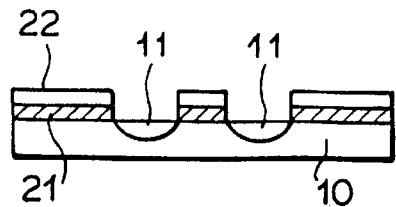

The resulting substrate 10 carrying thereon the optical channel waveguides 11 and the fractions of the metal layer are cleaned and subjected to heat treatment at 340° C. to 400° C. for a predetermined time. Then the upper Ta layer 23 is removed by etching with fluoronitric acid (1:2) as shown in FIG. 3E.

Figure 4F:
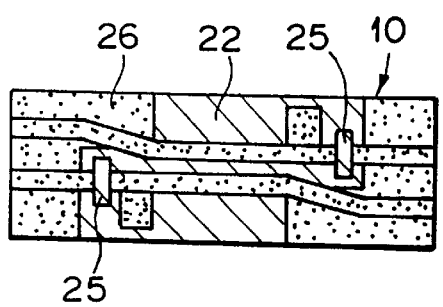
Figure 4C:
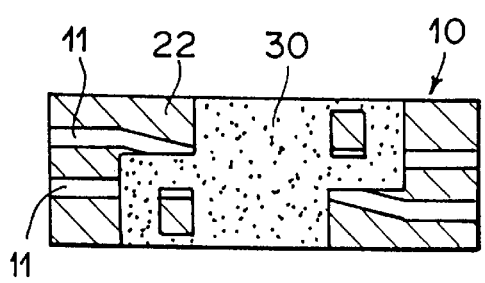
Figure 4G:
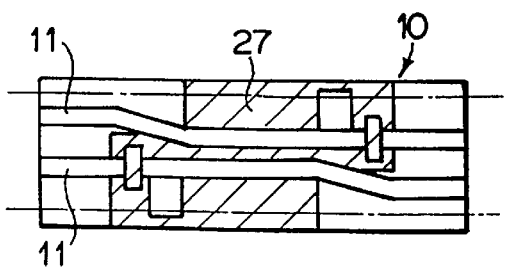
Figure 4D:
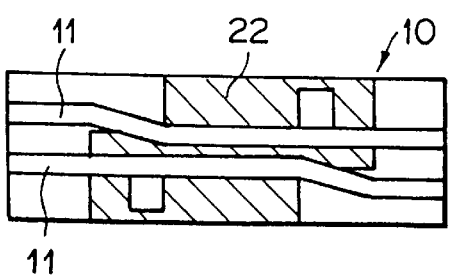

Thereafter, a resist pattern 30 for defining the shapes of the electrodes is formed on the substrate 10 as shown in FIG. 4C and the Ta layer 21 and the Au layer 22 are etched as shown in FIG. 4D using the resist pattern as a mask.

In order to form wirings for connecting the central electrode 13 and the pad electrodes 16 (FIG. 3F), a resist pattern having openings in portions where the wirings are to be formed is formed by lithography. Then Au/Cr is deposited on the substrate 10 by low resistance heating vacuum deposition and the resist pattern is removed by liftoff, leaving wirings 25 of Au/Cr as shown in FIG. 4E.

Thereafter negative photo-resist 26 is applied to the substrate 10, and light is projected onto the backside of the substrate 10 so that the portions of the photo-resist 26 just above the optical channel waveguides 11 are exposed with the Ta layer 21 and the Au layer 22 functioning as a mask. (The portions corresponding to the wirings 25 are not exposed.) When the photo-resist is developed, only the exposed portions of the photo-resist 26 are left on the substrate 10 as shown in FIGS. 3F and 4F.

Then Au layer 27 of, for instance, 1 to 4 μm is formed on the substrate 10 by electrolytic plating with the pattern of the photo-resist 26 used as a mask as shown in FIG. 3G.

Figure 4H:
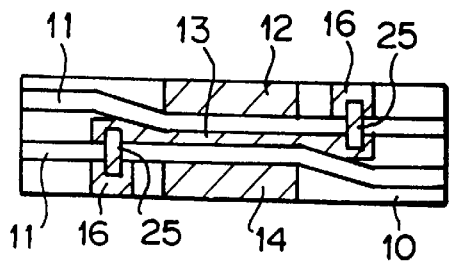

The resist layer 26 is removed by a plasma asher or resist release solution as shown in FIG. 4G. Then the substrate 10 is cut along the chained lines shown in FIG. 4G. Thus the electrodes 12, 13 and 14 and the pad electrodes 16 consisting of the Ta layer 21, the Au layer 22 and the plated Au layer 27 are formed as shown in FIGS. 3H and 4H.

The advantage of the second embodiment is basically the same as that of the first embodiment.

A third embodiment of the present invention will be described hereinbelow with reference to FIGS. 5A to 5E and 6A to 6E. FIGS. 5A to 5E are cross-sectional views taken along line C—C in FIG. 6A.

Figure 5A:
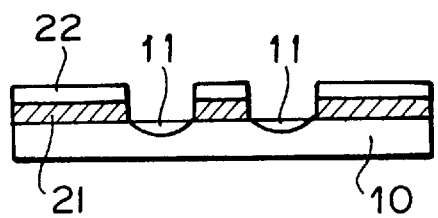

A substrate 10 carrying thereon the optical channel waveguides 11 and the fractions of the metal layers 21 and 22 as shown in FIGS. 5A and 6A is obtained in the same manner as in the first embodiment.

Figure 5B:
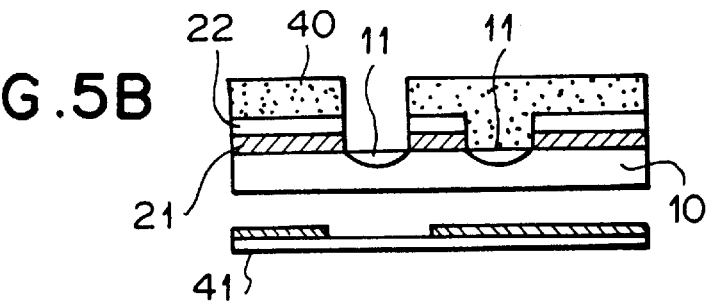

Thereafter, positive photo-resist 40 is applied to the substrate and a photo-mask 41 shown in FIG. 6C is disposed on the backside of the substrate, and light is projected onto the backside of the substrate through the photo-mask 41, thereby exposing the photo-resist 40 to light through the mask 41. When the photo-resist 40 is subsequently developed, a pattern of the photo-resist 40 having one opening just above each of the optical channel waveguides 11 is formed as shown in FIGS. 5B and 6B.

Figure 5C:
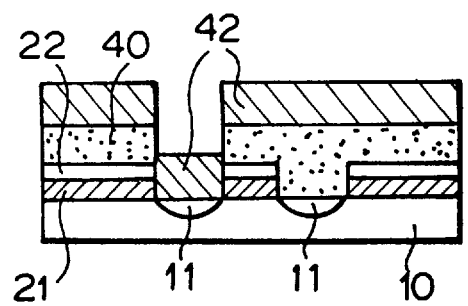

Then buffer layers 42 of $SiO_2$ are formed in a thickness of 100 nm to 500 nm, for instance, by sputtering using the resist pattern 40 as a mask as shown in FIG. 5C.

Figure 5D:
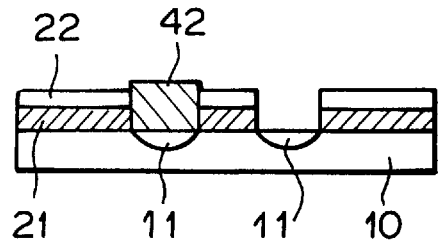

Thereafter the photo-resist 40 is removed by liftoff. In this manner a buffer layer 42 of $SiO_2$ is formed on each of the optical channel waveguides 11 as shown in FIGS. 5D and 6D.

Figure 5E:
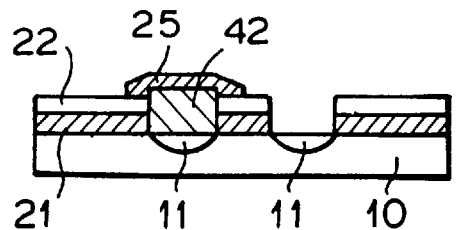

Wirings 25 of Cr/Au are formed on the buffer layers 42 as shown in FIGS. 5E and 6E.

Thereafter electrodes for applying an electric voltage to the optical channel waveguides 11 are formed, for instance, in the manner described above in conjunction with the first embodiment.

By thus forming buffer layers 42 of $SiO_2$ between the optical channel waveguides 11 and the wirings 25 extending across the optical channel waveguides 11, light propagation loss due to the wirings 25 can be reduced.

A fourth embodiment of the present invention will be described hereinbelow with reference to FIGS. 7A to 7E and 8A to 8D. FIGS. 7A to 7E are cross-sectional views taken along line D—D in FIG. 8A.

Figure 8A:
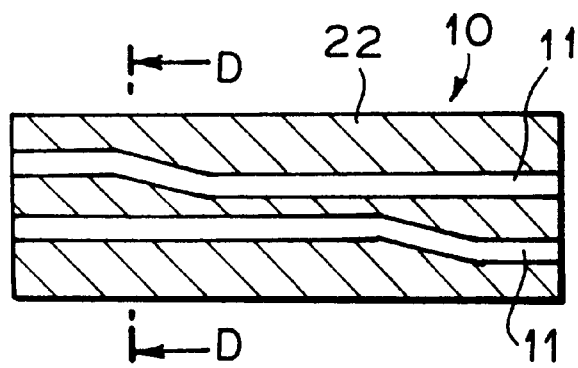
FIGS. 8A to 8D are plan views showing the state of the substrate at different steps shown in FIGS. 7A to 7E, FIGS. 9A to 9H are views for illustrating the procedure of forming the electrodes of an optical waveguide element by a conventional method.

A substrate 10 carrying thereon the optical channel waveguides 11 and the fractions of the metal layers 21 and 22 as shown in FIGS. 7A and 8A is obtained in the same manner as in the first embodiment.

Figure 8B:
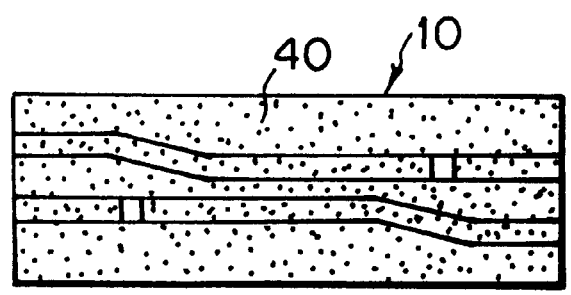
Figure 8C:
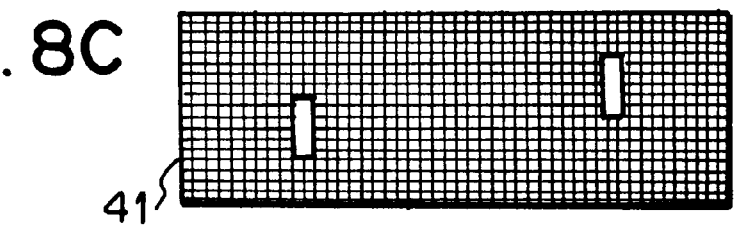

Thereafter, positive photo-resist 40 is applied to the substrate and a photo-mask 41 shown in FIG. 8C is disposed on the backside of the substrate, and light is projected onto the backside of the substrate through the photo-mask 41, thereby exposing the photo-resist 40 to light through the mask 41. When the photo-resist 40 is subsequently developed, a pattern of the photo-resist 40 having one opening just above each-of the optical channel waveguides 11 is formed as shown in FIGS. 7B and 8B.

Then buffer layers 42 of $SiO_2$ and Cr/Au layers 45 are formed in this order, for instance, by sputtering using the resist pattern 40 as a mask as shown in FIG. 7C.

Figure 8D:
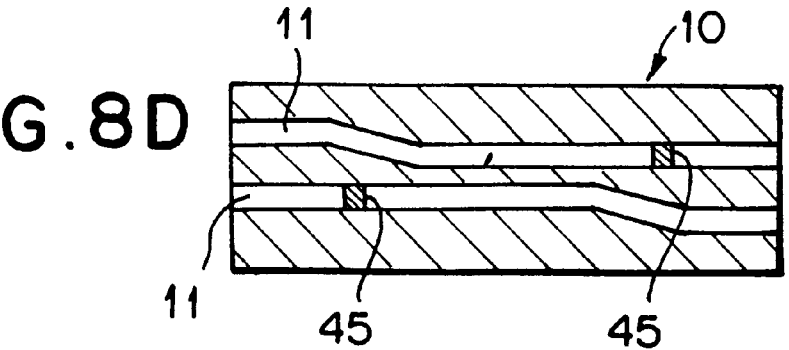
Figure 9A:
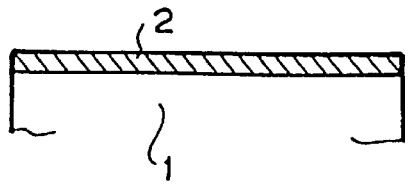
Figure 9B:
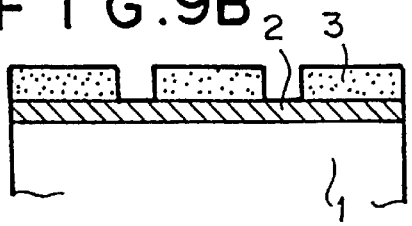
Figure 9C:
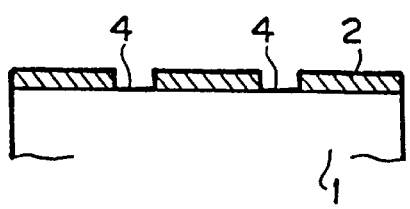
Figure 9D:
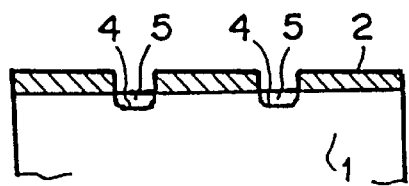
Figure 9E:
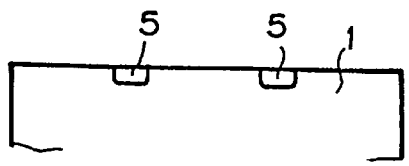
Figure 9F:
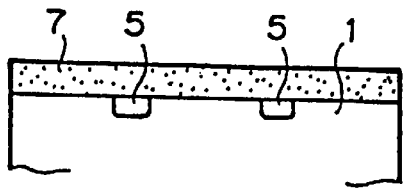
Figure 9G:
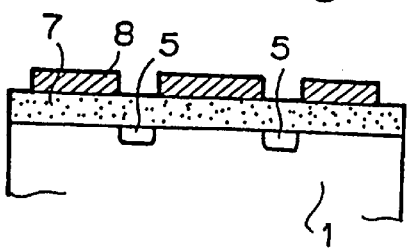
Figure 9H:
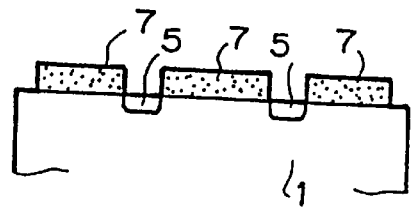
Figure 10:
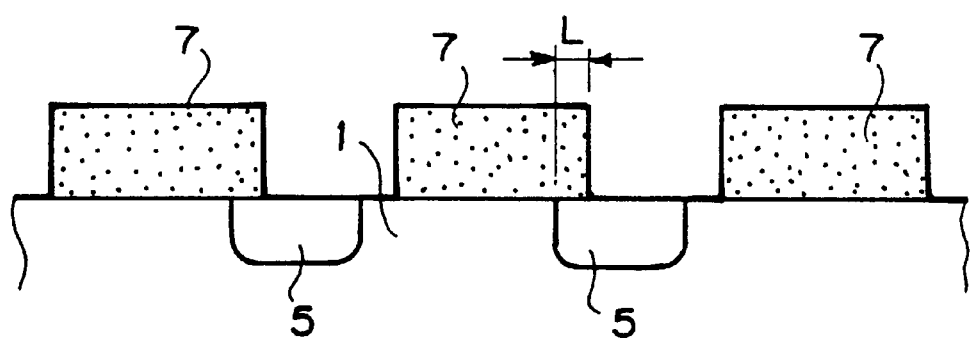
FIG. 10 is a view for illustrating alignment error of the electrodes formed by the conventional method.

Thereafter the photo-resist 40 is removed by liftoff. In this manner, a buffer layer 42 of $SiO_2$ and a wiring of Cr/Au layer 45 are formed on each of the optical channel waveguides 11 as shown in FIGS. 7D and 8D.

Then the substrate is plated with Au 27 except the portions just above the optical channel waveguides 11. Thus a thick Au layer 27 is formed on the Ta layer 21 and the Au layer 22 which form the electrodes for applying an electric voltage to the optical channel waveguides 11 and on the Cr/Au layer 45 forming the wirings as shown in FIG. 7E.

Thereafter the composite metal layer comprising the Au layer 27, the Au layer 22 and the Ta layer 21 is processed to predetermined shapes of the electrodes, for instance, by etching. Thus electrodes and wirings having increased thicknesses can be formed.

What is claimed is:

1. An electrode for an optical waveguide element which is formed on a substrate, for applying an electric voltage to the optical channel waveguide, the electrode comprising:

a metal film fraction comprising a part of a metal film terminating along an electrode edge and defining an edge of the optical channel waveguide formed on a substrate by proton exchange; and a plating metal layer formed on the metal film fraction by plating, wherein the edge of the electrode is aligned with and contacts the edge of the optical channel waveguide.

2. An electrode for an optical waveguide element as defined in claim 1, further comprising:

a buffer layer formed between the substrate and the metal film.

3. An electrode for an optical waveguide element as defined in claim 1 in which said substrate is of a material selected from the group consisting of a $LiNb_xTa_{1-x}O_3$ ($0 \leq x \leq 1$) crystal, a Mg-doped $LiNb_xTa_{1-x}O_3$ ($0 \leq x \leq 1$) crystal and a Zn-doped $LiNb_xTa_{1-x}O_3$ ($0 \leq x \leq 1$) crystal.

4. A combination of an optical waveguide element and an electrode for applying an electric voltage to the optical channel waveguide, the combination comprising:

an optical channel waveguide formed on a substrate by proton exchange;

a buffer layer formed on the optical channel waveguide; and an electrode which is formed on the substrate comprising:

a metal film fraction comprising a part of a metal film terminating along an electrode edge and defining an edge of the optical channel waveguide; and a plating metal layer formed on the metal film fraction by plating, wherein the edge of the electrode is aligned with and contacts the edge of the optical channel waveguide and abuts an edge of the buffer layer.

* * * * *